United States Patent [19]
Reed

[11] Patent Number: 5,429,383
[45] Date of Patent: Jul. 4, 1995

[54] BOAT TRAILER WITH ANTI-FRICTION SKIDS

[76] Inventor: Jay N. Reed, 309 Hancock Ct., North Wales, Pa. 19454

[21] Appl. No.: 95,823

[22] Filed: Jul. 21, 1993

Related U.S. Application Data

[63] Continuation of Ser. No. 821,576, Jan. 16, 1992, abandoned.

[51] Int. Cl.⁶ .................................................. B60P 3/10
[52] U.S. Cl. ................................... 280/414.1; 414/529
[58] Field of Search .............. 280/414.1, 414.2, 414.3; 414/529, 534, 535, 536, 538; 425/379.1

[56] References Cited

U.S. PATENT DOCUMENTS

| | | | |
|---|---|---|---|
| 2,676,716 | 4/1954 | Sallis | 280/414.1 X |
| 3,122,245 | 2/1964 | MacKusick | 280/414.1 X |
| 3,887,319 | 6/1975 | Cottingham | 425/379.1 |
| 4,422,665 | 12/1983 | Hinnant | 280/414.2 |
| 4,779,887 | 10/1988 | Briggs | 280/414.1 |
| 4,781,392 | 11/1988 | Cooper | 280/414.1 |
| 4,875,701 | 10/1989 | Godbersen | 280/414.1 |
| 5,002,299 | 3/1991 | Firehammer et al. | 280/414.1 |
| 5,005,846 | 4/1991 | Taylor | 280/30 |
| 5,060,963 | 10/1991 | Godbersen | 280/414.1 |

*Primary Examiner*—Brian L. Johnson
*Assistant Examiner*—Peter C. English

[57] ABSTRACT

A boat trailer includes ultrahigh molecular weight polyethylene anti-friction plates attached to the top of the skid padding which supports the hull of the boat. The high surface area and cushioning effect of the padding is retained while the friction of the skid is reduced. The ease of loading and unloading the boat is enhanced without adversely affecting the transportation of the boat while being trailered.

1 Claim, 6 Drawing Sheets

BOAT TRAILER WITH ANTI-FRICTION SKIDS

This is a continuation of application Ser. No. 07/821,576 filed on Jan. 16, 1992, now abandoned.

FIELD OF THE INVENTION

This invention relates to trailer-type vehicles and, more specifically, to a trailer for carrying water craft, such as personal pleasure boats.

BACKGROUND OF THE INVENTION AND PRIOR ART

Loading and unloading boats from the trailers which are used to carry them to and from the water site is a well-known problem. Various solutions have been devised in order to ease the loading and unloading procedure. Typically, the trailer with the boat attached is backed into the water and the boat is released from its securement and pushed backward off the end of the trailer into the water. The trailer usually enters the water until the hull of the boat is partly submerged to reduce the weight of the boat on the trailer to make it easy to remove. In order to increase the ease of pushing the boat off of the trailer, anti-friction members, such as rollers, have been employed as support members between the trailer and the hull of the boat. The problem with rollers or any other anti-friction device previously employed is the requirement of providing sufficient contact surface area between the trailer and the hull of the boat so that the boat may be securely held to the trailer during transportation without damage. The limited surface area contact between the rollers and hull of the boat creates high specific pressure between the rollers and hull of the boat which can cause damage. Also, because they are submerged under water, the electrical and mechanics of the trailer can become corroded and fail to work properly.

It is common practice for trailers to be fitted with simple flat skids, usually carpet-covered, to provide the necessary hull protection and supporting contact with the trailer during transport. However, padded skids because of their high friction with the hull of the boat make it extremely difficult to unload the boat from the trailer, especially when the unloading is attempted by one person.

SUMMARY OF THE INVENTION

In order to solve the problems in the boat trailer art described above, the applicants have discovered a boat trailer structure which combines the low-friction, longitudinal sliding resistance provided by rollers with the high surface area cushioned support of padded skids required during transportation. The invention includes the addition of ultrahigh molecular weight polyethylene anti-friction plates to the top of the skid padding. Thus, the high surface area and cushioning effect of the padding is retained while the friction of the skid is reduced. Surprisingly, the low sliding friction required by loading and unloading the boat off of and onto the trailer is even less than that of the supporting rollers known to the prior art.

This invention provides benefits and advantages unachievable by prior art boat trailers. For example, using the applicant's invention, an average size personal pleasure boat can be loaded and unloaded from the trailer by one person. Furthermore, because the boat is so easily moved onto and off of the trailer, it is not necessary to submerge the trailer prior to loading and unloading the boat. This results in keeping the trailer which usually incorporates electrical wiring and other sensitive mechanical components, such as wheel bearings, from being constantly wetted. Maintenance of the boat trailer is therefore significantly reduced. The trailer skids of the present invention also contribute to the reduction of damage to the hull of the boat. Pressure on the boat hull is reduced by the large contact surface area of the skids and the extremely low friction plastic skid plates offer no abrasive resistance to sliding against the boat hull. Therefore, in addition to ease of use, the maintenance costs of both the boat and the trailer are reduced when the present invention is employed. Other objects and advantages of the present invention will be readily apparent from the following drawings and description of the preferred embodiment.

In particular, the applicants have devised a boat trailer comprising a wheeled frame with one or more substantially horizontal longitudinal rails affixed to the frame and a skid affixed to the top of each rail, said skid comprising a high molecular weight polyethylene load-bearing plate. The skid may further include a cushion adhesively affixed between the load-bearing plate and the rail.

DESCRIPTION OF THE PREFERRED EMBODIMENT

Figure 1:
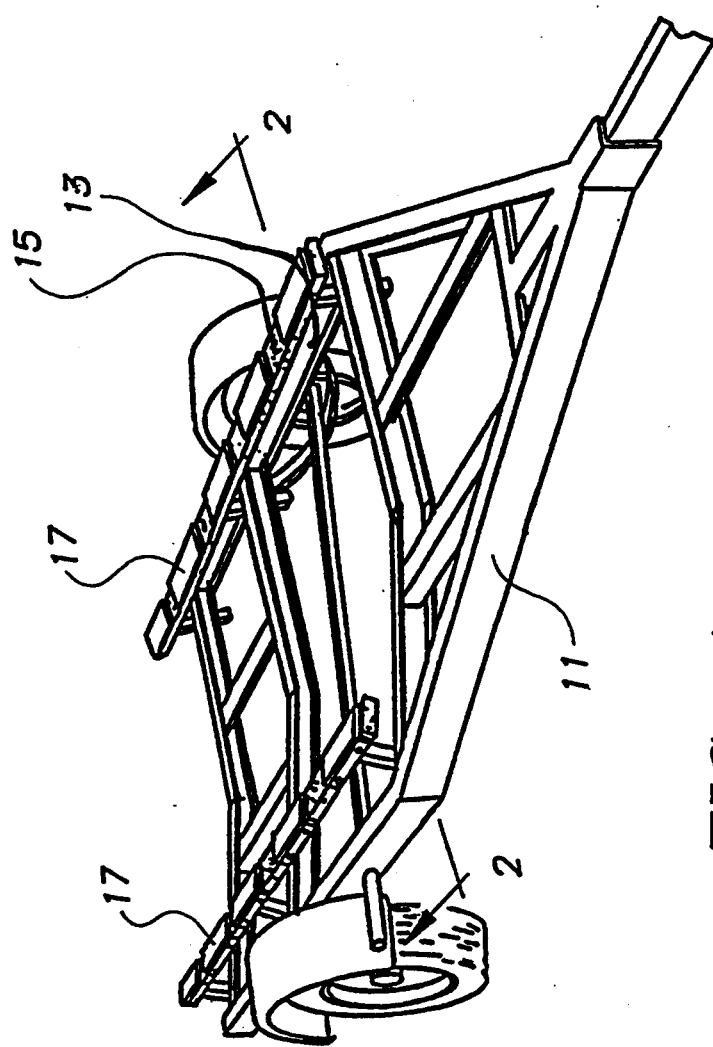
FIG. 1 is a top, left front isometric perspective view of the present invention.

FIG. 1 shows a very common type of simple boat trailer with a main frame 11 which includes longitudinal, substantially horizontal side rails 13 supporting left and right skids 15. Load-bearing plates 17 of the present invention are affixed to the top of both skids. In this figure, five load-bearing plates are employed on each of the skids, however, it should be kept in mind that the size and number of load-bearing plates employed may vary. The load-bearing plates are approximately ⅜" by 3" by 10" and are composed of an ultrahigh molecular weight polyethylene (UHMWPE). The specific material of the preferred embodiment is a product sold under the name "TIVAR(R)-100" which is sold by the Menasha Corporation of Fort Wayne, Ind.

Figure 2:
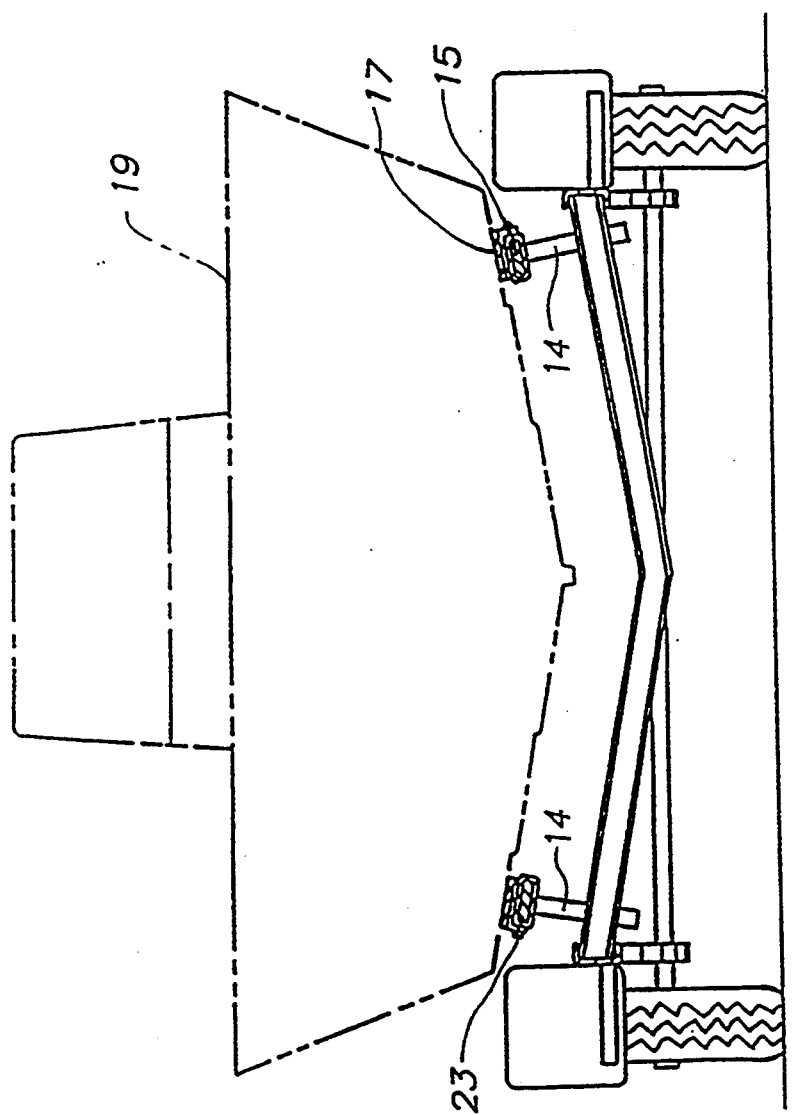
FIG. 2 is a rear-facing sectional view taken from FIG. 1 as shown in that figure with the addition of the boat drawn in phantom lines.

Referring to FIG. 2, the hull of a boat 19 used in conjunction with the present invention is shown in this figure drawn in phantom lines. Supporting posts 14 which mount the skids on the frame extend upwardly and inwardly from the frame so that the flat top surfaces of the load-bearing plates 17 are canted toward each other to provide the greatest possible contact area flush with the bottom of the boat.

Figure 3:
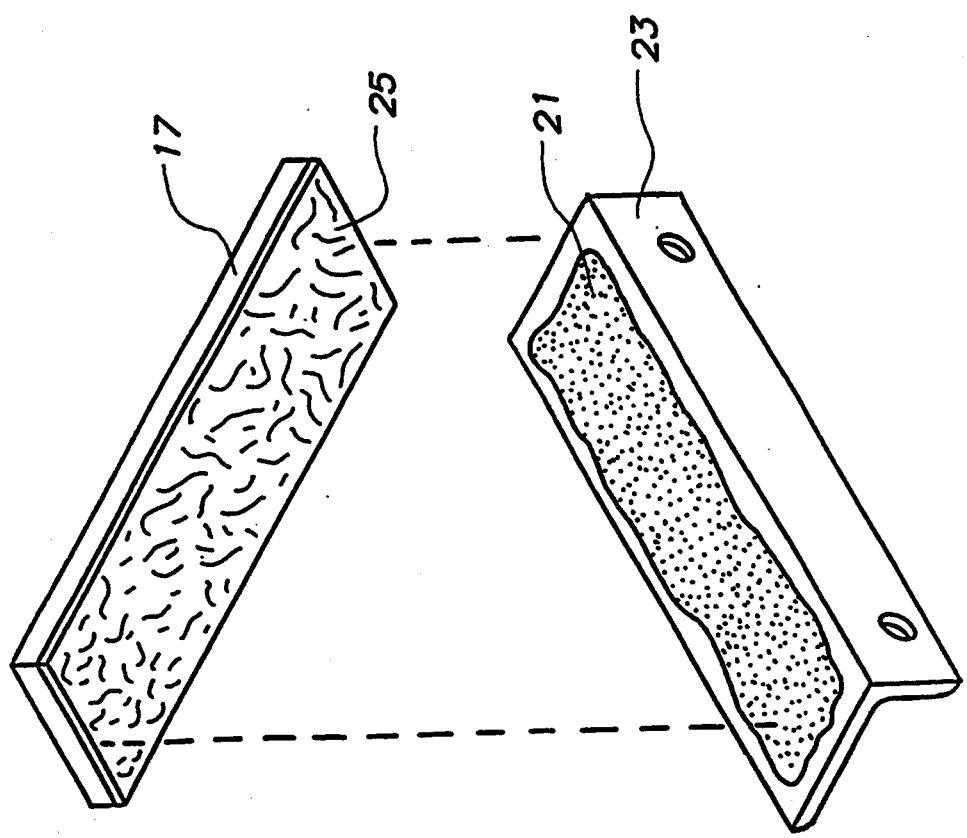
FIG. 3 is an assembly perspective view showing the trailer skid construction and affixation of the load-bearing plate and cushion material to the trailer frame.

Referring now to FIG. 3, simple adhesive 21 may be used between angle iron 23 and cushion 25. The adhesive 21 is laid on the angle iron beneath cushion material 25, which is also fastened to the load-bearing plate 17 by a similar adhesive therebetween. Angle iron 23 is attached to the skid as shown in FIG. 2. Affixed in this way, no fasteners are used that may interfere with the operation of the load-bearing plate or damage the boat.

Figure 4:
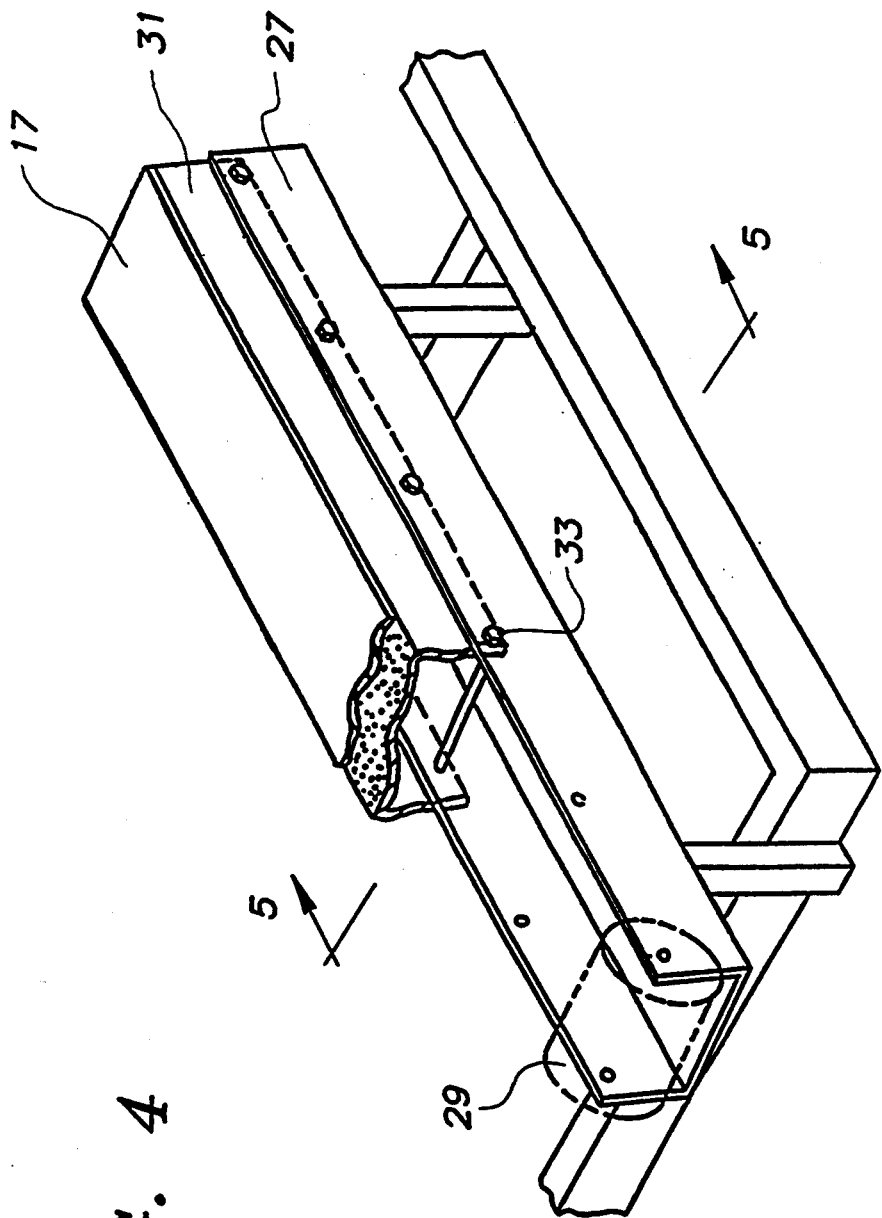
FIG. 4 is a perspective view of an alternate embodiment of the present invention.
Figure 5:
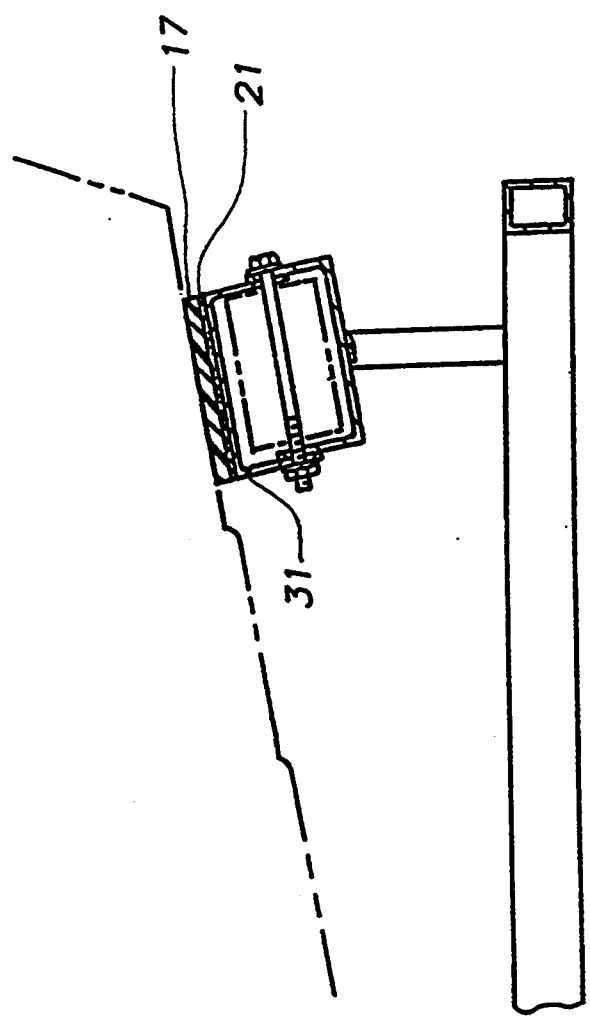
FIG. 5 is a front sectional view taken from FIG. 4 as shown in that figure with the addition of a boat drawn in phantom lines.

Referring now to FIGS. 4 and 5, a method of adapting a very common existing roller channel is shown. Channel 27 which normally holds roller 29 is used to support an added inverted channel 31 which carries the load-plate 17. The trailer frame channel and support channel may be connected by way of fasteners 33. In this embodiment, of course, the rollers are removed and become unnecessary because of the use of the load-bearing plate 17. FIG. 5 shows more detail of the interconnection between the channels described above. Adhesive 21 is used between the top channel and the load-bearing plate without a cushion being employed in this embodiment.

Figure 6:
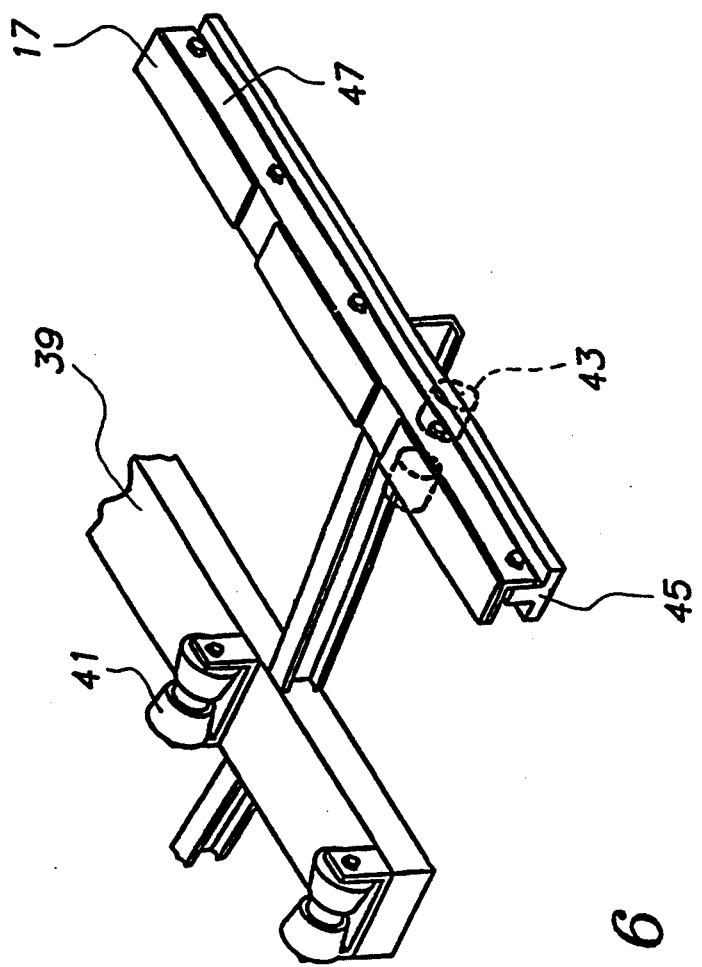
FIG. 6 is a perspective view of an alternate embodiment of the present invention.

Referring now to FIG. 6, yet another embodiment of the mounting method of the present invention is shown. In this instance, the frame includes a center section 39 which includes rollers 41 which support the center keel of the boat. In the prior art, these rollers operate in conjunction with side rollers 43 shown in phantom lines in this figure. In the present invention, the side rollers have been removed and inverted T-shaped side rails 45 support the angle iron mounting structure 47 to which the load-bearing plate 17 is affixed. This angle iron mounting method is similar to that shown in FIGS. 1-3.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A boat trailer for a boat having substantially flat canted undersurfaces extending obliquely upwardly from each side of the fore-to-aft centerline of said boat, comprising:

(a) a wheeled main frame comprising a pair of laterally spaced-apart, substantially horizontal rails extending longitudinally of said frame, one on each side of said centerline;

(b) a pair of skids each mounted to and above a different one of said rails, and extending generally parallel thereto;

(c) a plurality of horizontal, longitudinally spaced apart load-bearing plates on the top of each of said skids for directly supporting said boat, said load bearing plates being attached to said skids by respective right angled connectors;

(d) each of said plates being substantially rectangular, substantially flat, made of a low-friction high molecular weight plastic material, and having a top surface canted inwardly for supporting said boat conformingly on said flat undersurfaces thereof; and (e) a plurality of resilient cushioning members, each said cushioning member cemented to and between a respective one of said plates and the respective right angled connector;

whereby there is provided a large-area, low-friction, cushioned support for said boat to enable its easy and safe loading onto, unloading from, and transporting on said load-bearing plates of said trailer.

* * * * *